July 3, 1956 R. L. BATCHELOR 2,752,815
DETERMINATION OF BUTTERFAT CONTENT OF MILK PRODUCTS
Filed Aug. 7, 1952
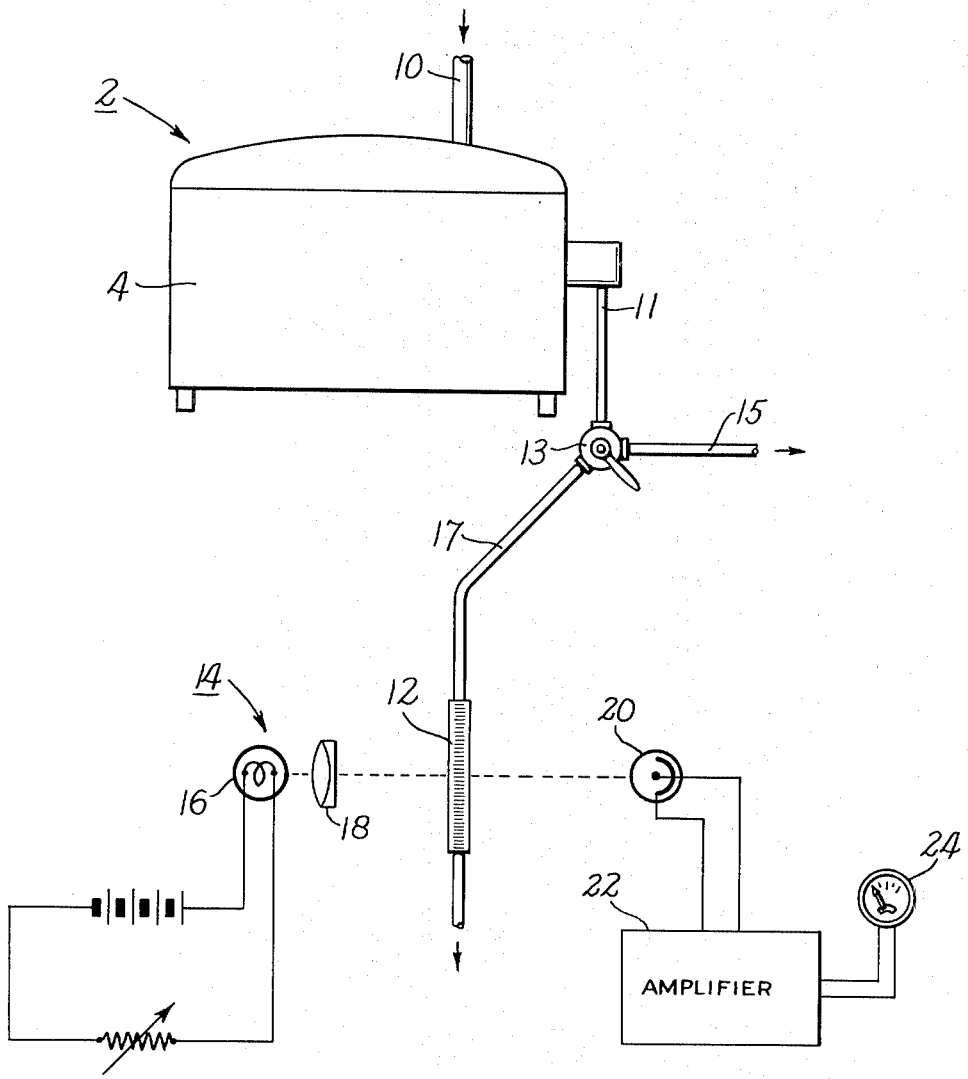
INVENTOR
Robert L. Batchelor
BY
Curtis, Morris & Safford
ATTORNEYS

2,752,815

DETERMINATION OF BUTTERFAT CONTENT OF MILK PRODUCTS

Robert L. Batchelor, Tenafly, N. J.

Application August 7, 1952, Serial No. 303,190

7 Claims. (Cl. 88—14)

This invention relates to improved methods for determining the butterfat content of milk.

Milk and cream are ordinarily sold commercially on the basis of butterfat content. The Babcock chemical analysis method is used for the determination of the percent butterfat content, but this process is relatively slow and tedious in that it requires careful preparation of samples, treatment with acid, and centrifuging. This testing procedure is so complex that in many instances the butterfat content of each batch of milk is not tested. Usually a composite sample is prepared from samples of the milk taken at periodic intervals and the butterfat determined on the composite sample. Thus, frequently milk is paid for on the basis of the average butterfat content of a number of different batches.

This invention provides an apparatus and method for determining rapidly and with reasonable accuracy the butterfat content of milk. The determinations can be made with such rapidity that each can of milk can be tested individually and the determination can be made while the milk is being weighed so that there is no significant delay because of the butterfat determination.

In a preferred embodiment of the invention, the larger particles or agglomerates of particles of butterfat are broken up to produce a smaller and more nearly uniform particle size. For most applications, it is sufficient if the maximum mean diameter of the butterfat particles is not significantly greater than four microns. This reduction in particle size can be obtained by forcing the milk through a small orifice having the requisite size opening. The light transmissibility of the milk is then measured under controlled conditions as a measure of the butterfat content. The correlation under these circumstances between the light transmissibility and the percentage butterfat is sufficiently accurate and stable to provide a useful measuring system.

Other features, objects, and advantages of this invention will be apparent from a consideration of the following detailed description of a preferred embodiment of the invention considered in connection with the accompanying drawing which represents diagrammatically apparatus for carrying out the invention.

The particle size of the butterfat in a sample of milk may be reduced to the necessary dimensions by any suitable process such as by the use of a high frequency vibration or by forcing the milk through a small orifice, for example one having a diameter of four microns. In the drawing, a homogenizer 2 of the latter type is illustrated having a unit 4 which is provided with orifices through which the milk is forced under high pressure. The milk enters the homogenizer at an inlet port 10 and it is discharged from unit 4 through a discharge port 11. At port 11, a two-way valve 13 normally directs the milk through a pipe 15 for further processing. However, the valve may be turned to direct part or all of the milk downwardly through a pipe 17 and thence through a container 12. Container 12 has a uniform rectangular cross section so as to form a thin vertical column of the flowing milk and it has transparent walls by means of which the light transmissibility of the milk is tested.

In order to measure the light transmissibility of the milk sample, a light source 14, including a lamp 16 and a lens and filter system, diagrammatically indicated at 18, is arranged to transmit a beam of light through the milk in the container 12 onto a photocell 20. The amount of light striking the photocell 20 is measured by any conventional type of apparatus and in its simplest form includes an amplifier 22 and a meter 24. This meter 24, which indicates the amount of light striking the photocell 20, may be calibrated in terms of percentage of butterfat in the milk sample.

A useful commercial system may be built in which the particle size of the butterfat content is reduced so as to have a maximum mean diameter of five microns or less. However, improved results are obtained if the maximum mean diameter is not greater than about four microns. For the most practical all-around system, I prefer that the average particle size be between three and four microns.

It will be understood that the apparatus for measuring the light transmissibility of the butterfat is illustrated only diagrammatically, and that the usual precautions to insure stability and linearity of the apparatus will be provided. Such apparatus is well known and is commercially available and, accordingly, need not be described here. Suitable arrangements are available for stabilizing the intensity of the light source 14, and various feed-back arrangements by which the illumination is varied to produce a constant intensity of light at the photocell 20 can be employed if desirable. Also, various bridge circuits are known using either one or two photocells and one or more samples of milk.

The thickness of the sample of milk in the container 12 through which the light beam passes will depend upon the intensity of the light beam and the sensitivity of the photocell. In a preferred arrangement, the light beam travels about 1/16 inch through the milk.

Improved results are obtained by the use of a substantially monochromatic light source. It is not required that the light be entirely of a single wavelength, but the light preferably is confined to a relatively narrow band of wavelengths to produce substantially monochromatic light. The particular wavelength chosen will depend upon the characteristics of the photocell being used and will be selected in accordance with the response characteristics of the photocell so as to provide good stability and relatively high sensitivity. In one apparatus, a radiation source having its principal transmission at wavelengths between 1.6 and 4.0 microns gave good results. In another arrangement, a filter formed of CG 241 Se red glass was used. This glass is identified in "Handbook of Chemistry and Physics," thirty-first edition" at pages 2308 and 2309 as the product of Corning Glass Works of Corning, New York and transmits radiation of the wave lengths .64 to .72 microns. To some extent, the wavelength of radiation used will be a function of the average size of the butterfat particles. Generally speaking, shorter wavelength radiation can be used to advantage with smaller particle size, although as pointed out above, the characteristics of the photocell must be taken into account.

In some applications where greater accuracy is desired, two or more substantially monochromatic light sources of different wavelength may be used and the relative readings at the two wavelengths correlated to minimize variations caused by color differences. A somewhat more elaborate system, having however substantial advantages for certain applications, includes apparatus for measuring the light transmissibility of the milk sample substantially throughout or even beyond the visible spectrum so that a curve of light transmissibility can be prepared over the entire range. Correlation of this curve with previously calibrated curves results in high accuracy. Such curves can be drawn automatically by the use of suitable recording mechanism.

Under some circumstances, the mode of operation and the results are improved by providing for adding a dye to the milk or cream prior to passage through chamber 12. For example, a dye may be used which is absorbed only by the butterfat, in which case the butterfat is given an intense coloring, such as red. In such case, the testing equipment is so adjusted as to be particularly responsive to the color of the dye. Under other circumstances, a dye may be used which will not be absorbed by the butterfat but which will be absorbed by the other constituents of the milk or cream. In such case, a negative response to the coloring dye is provided in the testing equipment. Hence, an absence of the dye indicates a high butterfat content.

From the foregoing, it will be apparent that the process described herein is well adapted to meet the ends and objects hereinbefore set forth, and that it provides a rapid and economical method of measuring butterfat content and although not intended to replace the Babcock analysis in all applications provides an economical and rapid method of butterfat analysis permitting the determination of butterfat content under circumstances where it would be impractical to use the Babcock system. In the above, and in the claims, the term "milk" has been used in its broader sense as meaning milk products in general, including whole milk and partially skimmed milk and also including cream.

I claim:

1. The method of determining the butterfat content of milk comprising the steps of reducing the size of the butterfat particles of a sample of milk to a maximum mean diameter not significantly greater than four microns, passing light through the treated sample, and measuring the relative light transmissibility of said sample as a measure of the butterfat content of said milk.

2. The method of measuring the butterfat content of milk comprising the steps of reducing the particle size of butterfat contained in a sample of milk so that the average particle size is between three and four microns, passing light through said sample, and measuring the relative absorption of said light by said sample as a measure of the butterfat content of said milk.

3. The method of determining the butterfat content of milk comprising the steps of reducing the particle size of the butterfat in said milk to an average size not significantly greater than four microns, passing substantially monochromatic light through said milk after reduction of the butterfat particle size, and measuring the relative intensity of the light transmitted by said milk as a measure of the butterfat content.

4. The method of measuring butterfat content of milk comprising the steps of forcing milk through an orifice having a diameter between three and five microns, directing a beam of light through said milk, and measuring the relative intensity of the light transmitted by said milk as a measure of the butterfat content of said milk in accordance with a pre-established correlation.

5. The method of determining the butterfat content of milk comprising the steps of reducing the size of the butterfat particles of a sample of milk to a maximum mean diameter not significantly greater than four microns, passing light through approximately 1/16 inch thickness of the treated sample, and measuring the relative light transmissibility of said sample as a measure of the butterfat content of said milk.

6. The method of determining the butterfat content of milk comprising the steps of reducing the particle size of the butterfat in said milk to an average size not significantly greater than four microns, passing light consisting of a relatively narrow range of wavelengths through said milk after reduction of the butterfat particle size, and measuring the relative intensity of the light transmitted by said milk as a measure of the butterfat content.

7. The method of measuring butterfat content of milk comprising the steps of forcing milk through an orifice having a diameter between three and five microns, directing first and second beams of substantially monochromatic light through said milk, said beams being formed of substantially different wavelengths of light, and comparing the intensities of the beams of light transmitted by said milk as a measure of the butterfat content of said milk in accordance with a pre-established correlation.

References Cited in the file of this patent

UNITED STATES PATENTS

| | | |
|---|---|---|
| 1,312,358 | Robinson | Aug. 5, 1919 |
| 2,129,516 | Wood | Sept. 6, 1938 |